(No Model.)

W. P. CLIFFORD.
GRAIN CLEANING CYLINDER.

No. 383,627. Patented May 29, 1888.

WITNESSES:
Fred G. Dieterich
Chas. R. Wright

INVENTOR:
Wm. P. Clifford
BY Munn & Co
ATTORNEYS.

UNITED STATES PATENT OFFICE.

WILLIAM P. CLIFFORD, OF OTTUMWA, ASSIGNOR TO DAVID W. TEMPLETON, OF FAIRFIELD, AND THE WESTERN MACHINE WORKS, OF OTTUMWA, IOWA.

GRAIN-CLEANING CYLINDER.

SPECIFICATION forming part of Letters Patent No. 383,627, dated May 29, 1888.

Application filed March 15, 1886. Serial No. 195,269. (No model.)

*To all whom it may concern:*

Be it known that I, WILLIAM P. CLIFFORD, of Ottumwa, in the county of Wapello and State of Iowa, have invented a new and useful Improvement in Grain-Cleaning Cylinders, of which the following is a full, clear, and exact description.

Reference is to be had to the accompanying drawings, forming a part of this specification, in which—

Figure 1:
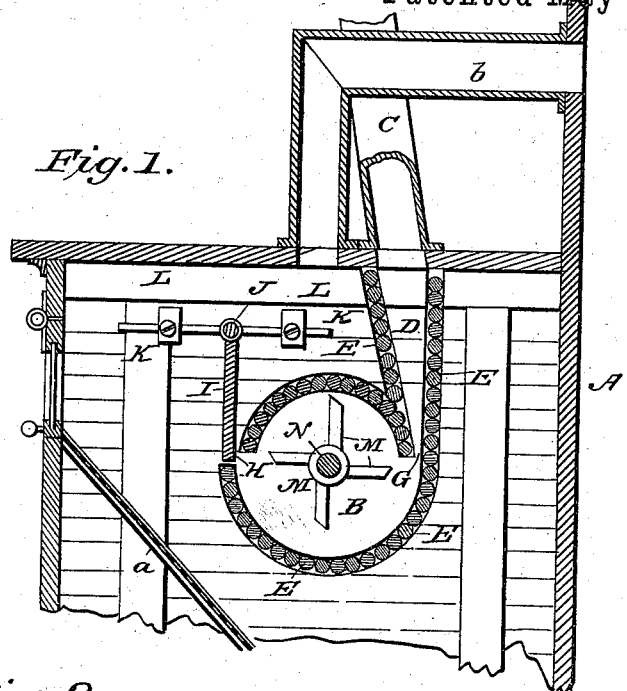
Figure 2:
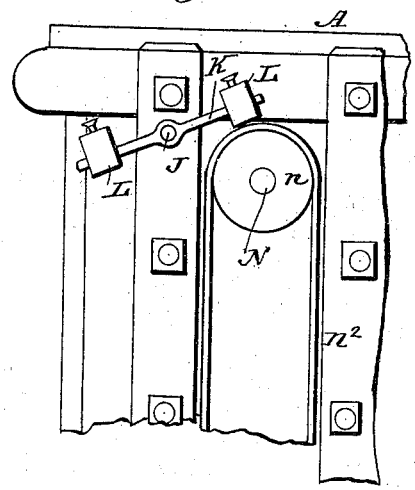
Figure 3:
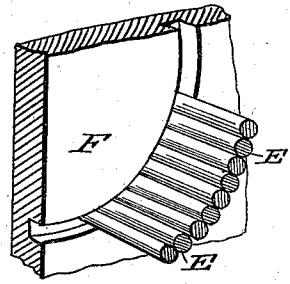

Figure 1 is a vertical section of a portion of the frame of a cleaning-machine having my improvement applied. Fig. 2 is a side elevation of the same, and Fig. 3 is a detail view.

My invention relates to improvements in grain-cleaning cylinders; and it consists in the peculiar construction and arrangement of parts, as hereinafter fully described, and pointed out in the claims.

Referring to the drawings by letter, A represents a portion of the frame of a grain-cleaning machine, provided with the screen $a$ and the flue $b$, about which there is nothing new.

B is a cleaning-cylinder formed of half-inch iron rods E, placed side by side, with their ends resting in the grooves of the iron heads F, attached to the frame A. The upper half of the cylinder is made on a shorter radius than the lower half, leaving narrow longitudinal openings G H between the adjacent edges of the said halves or parts. The opening G serves as an inlet-opening for the grain, and with it is connected the discharge-opening of the hopper D, to which the grain is supplied through the spout C. The walls of the hopper D are formed of a series of iron rods similar to the cylinder. The opening H of the cylinder serves as a discharge-opening for the grain, and is closed by a valve, I, which is rigidly attached at its upper edge to a rod, J. The ends of the rod J rock in bearings attached to the frame A, and to one end is rigidly attached a cross-rod, K, upon the ends of which are placed the adjustable weights L. The weights L are secured to the rods K by set-screws or other suitable means, so that they can be readily secured in place when adjusted. With this construction, by adjusting the weights L, the valve I can be held shut against any desired amount of grain-pressure, and will open when the grain-pressure exceeds the fixed limit and allow the grain to escape, so that the grain can be subjected to any required amount of cleaning.

The grain while in the cylinder is operated upon by the beater-arms M, attached to the shaft N, which revolves in bearings attached to the frame, and can be driven at any desired speed and from any convenient power.

I have shown the end of the shaft N provided with a pulley, $n$, over which a belt, $n^2$, passes, the said belt being designed to pass over a pulley on the end of another beater-shaft in a cylinder similarly constructed to and below the one hereinbefore described when it is desired to cause the grain to be subjected to a second treatment. This, however, forms no part of the present invention.

The cylinder constructed as above described is simple, cheap, and very effective for the purpose for which it is designed.

Having thus described my invention, what I claim, and desire to secure by Letters Patent, is—

1. A grain-cleaning cylinder consisting of an upper and lower section, the upper section being of a shorter radius than the lower one, forming longitudinal inlet and discharge openings, in combination with a beater therein, substantially as herein shown and described.

2. A grain-cleaning cylinder consisting of an upper and lower section, each formed of grooved end plates and a series of rods held in the grooves of the said plates, the upper section being of a shorter radius than the lower one, forming longitudinal inlet and outlet openings, in combination with a beater in said cylinder, substantially as herein shown and described.

3. The combination of a grain-cleaning cylinder having its upper part formed on a shorter radius than the lower part, forming longitudinal inlet and discharge openings, a hinged and weighted valve at the discharge-opening, and a beater in the said cylinder, substantially as herein shown and described.

4. The combination, with a cylinder composed of parallel iron rods secured to end plates, the upper part being of a shorter radius than the lower part, forming longitudinal inlet and discharge openings at opposite sides, and a beater in said cylinder, of a valve at the discharge-opening and adjustable weights for holding the valve closed and regulating the discharge of grain from the cylinder, substantially as herein shown and described.

5. The combination, with the cylinder E F, having the inlet and discharge openings G H, of the pivoted rod J, provided with the cross-rod K, the valve I, secured to the rod J, and the weights L, adjustably secured on the rod K, substantially as herein shown and described.

WILLIAM P. CLIFFORD.

Witnesses:
A. J. BRYANT,
HORACE SEBERELL.